(12) United States Patent
Avakian et al.

(10) Patent No.: US 10,975,881 B2
(45) Date of Patent: Apr. 13, 2021

(54) CENTRIFUGAL IMPELLER FOR A TURBINE ENGINE

(71) Applicant: SAFRAN AIRCRAFT ENGINES, Paris (FR)

(72) Inventors: Sylvain Frederic Avakian, Melun (FR); Arnaud Jacques Jean Gascq, Paris (FR); Felipe Winston Gomez Moyano, Maisons Alfort (FR); Damien Bernard Emeric Guegan, Fontainebleau (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 144 days.

(21) Appl. No.: 15/962,184

(22) Filed: Apr. 25, 2018

(65) Prior Publication Data

US 2018/0313360 A1    Nov. 1, 2018

(30) Foreign Application Priority Data

Apr. 26, 2017   (FR) ...................................... 17 53630

(51) Int. Cl.
*F04D 29/28* (2006.01)
*F04D 17/12* (2006.01)
(Continued)

(52) U.S. Cl.
CPC .............. *F04D 29/286* (2013.01); *F02C 3/08* (2013.01); *F04D 17/12* (2013.01);
(Continued)

(58) Field of Classification Search
CPC .. F04D 29/286; F04D 29/284; F04D 29/2216; F04D 17/12; F02C 3/08;
(Continued)

(56) References Cited

U.S. PATENT DOCUMENTS 3,925,036 A * 12/1975 Shacter ................ B01D 53/226
                                                                    95/48
4,333,748 A *  6/1982 Erickson ............... F16C 33/103
                                                                   415/188

(Continued)

FOREIGN PATENT DOCUMENTS

| CN | 201187477 | 1/2009 |
| JP | 2002-202094 | 7/2002 |

(Continued)

OTHER PUBLICATIONS

English Tranlsation—SU 823602 Al (Year: 1979).*

(Continued)

*Primary Examiner* — Ninh H. Nguyen
*Assistant Examiner* — Brian Christopher Delrue
(74) *Attorney, Agent, or Firm* — Oblon, McClelland, Maier & Neustadt, L.L.P.

(57) ABSTRACT

A centrifugal impeller having an axis of rotation extending from front to rear, and including a body extending around the axis of rotation, the body having a front portion and a rear portion of larger section than the front portion, the impeller also have blades projecting from a front face of the body, the body presenting a setback in its front face between two consecutive blades, which setback is situated at a circumferential distance from the two blades.

19 Claims, 4 Drawing Sheets

(51) Int. Cl.
 *F04D 29/22* (2006.01)
 *F02C 3/08* (2006.01)

(52) U.S. Cl.
 CPC ....... *F04D 29/2216* (2013.01); *F04D 29/284* (2013.01); *F05D 2220/3216* (2013.01); *F05D 2220/3219* (2013.01); *F05D 2230/10* (2013.01); *F05D 2250/291* (2013.01); *F05D 2250/60* (2013.01); *F05D 2260/15* (2013.01); *F05D 2260/941* (2013.01)

(58) Field of Classification Search
 CPC .......... F05D 2230/10; F05D 2250/291; F05D 2220/3219; F05D 2220/3216; F05D 2260/15; F05D 2250/60; F05D 2260/941
 See application file for complete search history.

(56) References Cited

U.S. PATENT DOCUMENTS

| | | | | |
|---|---|---|---|---|
| 4,619,590 | A * | 10/1986 | Johnson | F02C 6/12 417/407 |
| 6,530,979 | B2 * | 3/2003 | Firey | B01D 45/16 415/169.2 |
| 10,480,325 | B2 * | 11/2019 | Takabatake | F01D 5/16 |
| 2005/0111971 | A1 * | 5/2005 | Fukizawa | F04D 29/284 415/204 |
| 2009/0205362 | A1 * | 8/2009 | Haley | F04D 17/122 62/510 |
| 2012/0124994 | A1 * | 5/2012 | Hommes | F04D 29/30 60/605.1 |
| 2012/0272663 | A1 * | 11/2012 | Moussa | F01D 5/146 60/805 |
| 2016/0177726 | A1 * | 6/2016 | Striedelmeyer | F01D 5/12 416/144 |

FOREIGN PATENT DOCUMENTS

| | | | | |
|---|---|---|---|---|
| JP | | 2009-133267 | | 6/2009 |
| SU | | 823602 | | 4/1981 |
| SU | | 823602 | A1 * | 4/1981 |
| WO | WO-2014046927 | A1 * | 3/2014 | ............ F01D 5/225 |

OTHER PUBLICATIONS

French Preliminary Search Report dated Jan. 8, 2018 in French Application 17 53630 filed on Apr. 26, 2017 (with English Translation of Categories of Cited Documents).

* cited by examiner

CENTRIFUGAL IMPELLER FOR A TURBINE ENGINE

TECHNICAL FIELD

The present disclosure relates to a centrifugal impeller, and more particular to a centrifugal compressor impeller through which a fluid, and in particular a gas, is to pass. The impeller is particularly intended for fitting to a turbine engine compressor. The impeller may be fitted to any type of turbine engine, whether terrestrial or for aviation, and in particular an airplane turboshaft engine.

TECHNOLOGICAL BACKGROUND

An aviation turbine engine compressor of centrifugal type or of combined axial and centrifugal type comprises one or more compression stages with a centrifugal impeller, also referred to as a centrifugal rotor or wheel, the blades of the impeller being surrounded on the outside by a casing, and one or more diffusers being situated downstream from the impeller. Such a compressor passes a fluid in the form of a gas, generally air.

Rotation of the impeller sucks in the fluid from the front of the impeller, with the axial speed of the fluid passing through the impeller being transformed progressively into radial speed, so that the fluid leaves at the outer periphery of the impeller at the trailing edges of the blades. In the impeller, the absolute speed of the gas increases as a result of the centrifugal acceleration, and the pressure of the gas increases as a result of the increase in radius on passing through the impeller. Thus, the gas leaves the downstream ends of the blades (their trailing edges) at a total pressure that is greater than at the inlet.

A known example of a centrifugal impeller is described in international publication WO 2010/139901.

In a compressor in particular, the impeller is a part that is critical in terms of lifetime, and sometimes it is the part that is the most critical, in particular because of low cycle fatigue. There thus exists a need for a novel type of centrifugal impeller that presents an increased lifetime in terms of low cycle fatigue.

SUMMARY

To this end, the present disclosure provides a centrifugal impeller having an axis of rotation extending from front to rear, and comprising a body extending around the axis of rotation, the body having a front portion and a rear portion of larger section than the front portion, the impeller also having blades projecting from a front face of the body, the body presenting a setback in its front face between two consecutive blades, which setback is situated at a circumferential distance from said two blades.

In the present disclosure, "upstream" and "downstream" are defined relative to the normal flow direction of the fluid passing through the impeller.

Furthermore, the axis of rotation of the impeller is often referred to more simply as the "impeller axis". The axial direction corresponds to the direction of the impeller axis. The adjectives "front" and "rear" are used relative to the axial direction, with fluid entering the impeller via the front. A radial direction is a direction perpendicular to the impeller axis and intersecting that axis. Likewise, an axial plane is a plane containing the impeller axis and a radial plane is a plane perpendicular to that axis. The adverbs "axially" and "radially" refer respectively to the axial direction and to the radial direction. A circumference extends as a circle lying in a radial plane and having its center lying on the impeller axis. A tangential or circumferential direction is a direction that is tangential to a circumference; it is perpendicular to the impeller axis but does not intersect that axis.

Finally, unless specified to the contrary, the adjectives "inner" and "outer" are used relative to a radial direction, an inner portion (i.e. a radially inner portion) of an element being closer to the impeller axis than an outer portion (i.e. a radially outer portion) of the same element.

The impeller body, and in particular its radially outer portion, is sometimes referred to as the shroud. The body may present substantially axial symmetry about the axis of the impeller.

The front portion and the rear portion of the body are thus labeled relative to each other, in that the front portion is further forward along the axial direction than the rear portion. The front and rear portions are not necessarily situated at the front and rear ends of the impeller. By way of example, behind the rear portion, the impeller could include a substantially axially symmetric cylinder of section smaller than the section of the rear portion.

Each blade may have an upstream edge, referred to as its leading edge, and a downstream edge, referred to as its trailing edge. Such a centrifugal compressor impeller may have blades of two types: blades referred to as "main" blades and blades referred to as "intermediate" blades. The intermediate blades are optional, being interposed between the main blades, and they differ therefrom in that they are axially shorter: they present shorter front portions, the leading edges of the intermediate blades being set back (i.e. rearwards) relative to the leading edges of the main blades. Thus, depending on the embodiment, two consecutive blades may be two main blades, a main blade and an intermediate blade, or two intermediate blades.

A setback may be a partial recess in the body, in particular in its thickness, or may be a removal of material, sometimes referred to as "scraping". Since the setback is situated circumferentially at a distance from said two blades, the setback is a setback providing space additional to the space that normally lies between two consecutive blades.

The setback leads to a change in the shape of the impeller, specifically its body, thereby creating a zone of stress concentration between the blades. The setback thus seeks to offset some of the stresses that normally act in zones that are more critical for the low cycle fatigue lifetime of the impeller towards a zone that is generally stressed little, such as a zone situated between two consecutive blades and at a distance from said blades. As a result, stresses are better distributed within the impeller, so the maximum stresses in the impeller are reduced, thereby increasing the low cycle fatigue lifetime of the impeller. In addition, the setback reduces stresses in the body insofar as its presence reduces the tangential stiffness of the body.

Such a technical solution is particularly advantageous in that it avoids any need to redesign the blades, which would require completely redefining the balance in the impeller between mechanical performance and aerodynamic performance, and it also avoids modifying thermal operating parameters, which have direct consequences on the performance of the impeller, and indeed more widely on the compressor and on the turbine engine as a whole.

Furthermore, overall thinning of the body of the impeller cannot be envisaged since that would lead to problems of dynamics and to problems with clearances.

Furthermore, such an impeller is easy to fabricate, since the desired setback can be obtained simply by performing machining or milling at the end of current fabrication methods.

In some embodiments, the setback is provided on a radially outer portion of the body. The setback may be designed to be in register circumferentially with the rear portions of the blades, i.e. closer to their respective trailing edges than to their leading edges. The setback thus makes it possible to offset effectively the stresses that normally act in the body at the bases of the blades, where the inventors have observed that such stresses are at a maximum close to the trailing edges, i.e. in the rear portion of the body, in particular when the trailing edge portions of the blades extend in the direction of rotation of the impeller, as in the above-mentioned international publication.

In some embodiments, the setback leads to the radially outer periphery of the body. This makes it possible to further reduce the tangential stiffness of the body, thereby accommodating greater deformation and relaxing stresses at the outer periphery, in particular in the tangential direction, and thus further reducing the stresses in the body of the impeller.

In some embodiments, the setback has an outline that is generally U-shaped, wherein branches of the U-shape lead to the radially outer periphery of the body. A shape that is generally U-shaped may have two branches, which are generally substantially straight, connected together by a rounded portion. Such a shape serves to have relatively little impact on the aerodynamic performance of the impeller and to guide the flow of fluid in regular manner towards the outlet of the impeller, to the outside.

In some embodiments, the setback is situated between a pressure side of one of the two blades and a suction side of the other of the two blades, and is closer to said suction side than to said pressure side. In particular, this condition may be assessed at the outer periphery of the impeller. When the impeller is rotating, the pressure side is the side of the blade that meets the fluid first, before the suction side. The fluid is at a greater pressure on the pressure side and at a lower pressure on the suction side. Such a provision correspondingly improves offsetting the stresses that normally act in the body at the bases of the blades, where the inventors have observed that those stresses are greater on the suction sides than on the pressure sides of the blades.

In certain embodiments, the setback presents a bottom portion and a first connection zone arranged around the bottom portion and substantially tangential to the bottom portion. The bottom portion may be substantially parallel to the front face of the body or to the rear face of the body. The first connection zone may be provided in part around a portion of the bottom, e.g. around the outline that is generally U-shaped. In particular, the first connection zone may itself be generally U-shaped. The first connection zone need not be necessary where the setback leads to the radially outer periphery of the body. The first connection zone improves the distribution of stresses between the front face and the setback.

In the meaning of the present disclosure, and unless specified to the contrary, any mention of a "first" element, such as a "first" connection zone, does not necessarily imply that there exists a "second" element, nor, where a second element does exist, any ordered relationship between the first and second elements. In this context, ordinal qualifications are used solely for clarification and identification purposes, without implying any particular characteristics. Likewise, and correspondingly, mentioning an element of higher rank (third, etc.) does not in any way imply that elements of lower rank, such as a possible second element, exist and/or possess characteristics that might have been mentioned elsewhere.

In some embodiments, the setback presents a second connection zone that is provided around the first connection zone and that is substantially tangential firstly to the first connection zone and secondly to the front face of the body. The second connection zone may be provided in part around the first connection zone. The second connection zone may be generally U-shaped. By connecting the front face of the body tangentially with the first connection zone, the second connection zone improves the regularity of flow through the impeller.

In some embodiments, the impeller includes a stiffener configured to reinforce a portion of the body made thinner by the setback. Specifically, offsetting stresses into the setback could be excessive if the body is made too thin by the presence of the setback. Consequently, the stiffener, which may be local or distributed over the entire impeller, serves to rebalance stresses by reinforcing at least the portion of the body that is made thinner by the setback. The stiffener serves to "stiffen" the body, locally increasing its stiffness so as to compensate in part for the loss of stiffness due to the setback, but without that losing the advantages of the presence of the setback in terms of stress distribution.

In some embodiments, the stiffener comprises extra thickness provided on the rear face of the body. Such a stiffener is easy to fabricate.

In some embodiments, the stiffener is provided at least in part in register with the setback in the axial direction.

In some embodiments, the stiffener is in the form of a continuous ring around the axis of rotation. The ring may be substantially annular. The stiffener may present axial symmetry about the axis of the impeller. Thus, fabricating the stiffener leads to no particular difficulty, which generally makes it possible to avoid disturbing the vibration dynamics of the impeller.

In some embodiments, the stiffener leads to the radially outer periphery of the body. The stiffener can thus be defined radially firstly by the outer periphery of the body and secondly by a curve around the axis of the impeller, e.g. a circle centered on the axis of the impeller.

In some embodiments, a third connection zone is provided at least in part around the stiffener. This improves the regularity of flow over the rear face of the impeller, while reducing additional stresses that would be associated with the presence of a factor for geometrically concentrating stresses. Preferably, the third connection zone is tangential to the rear face of the body. A rear face of the stiffener may be substantially parallel to the rear face of the body.

The present disclosure also provides a compressor for a turbine engine, including a centrifugal impeller as described above, and also a turbine engine including such a compressor.

In some embodiments, the turbine engine further comprises a diffuser placed at the outlet from the impeller, the diffuser having stationary vanes mounted between a front casing and a rear casing, and the diffuser is arranged so that in operation the front face of the rear casing runs on from the setback. Thus, the setback provided in the front face of the body and the front face of the rear casing together form a regular guide wall for the flow that is locally without any constriction discontinuity, which may also be referred to as an "upward step". Compared with a conventional turbine engine, and depending on the space available, the diffuser may be made larger or it may merely be moved towards the rear of the impeller.

BRIEF DESCRIPTION OF THE DRAWINGS

The invention and its advantages can be better understood on reading the following detailed description of embodiments of invention given as non-limiting examples. The description refers to the accompanying drawings, in which.

DETAILED DESCRIPTION

Figure 1:
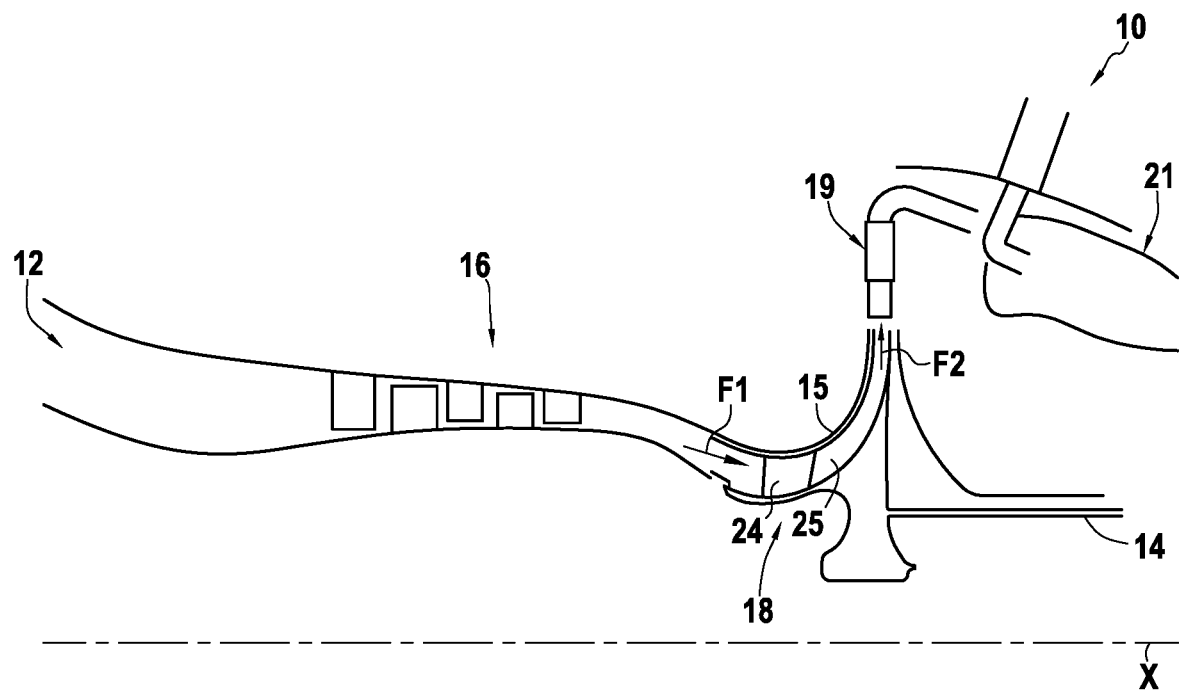
FIG. 1 is a diagrammatic and fragmentary axial section view of an airplane turbine engine having a compressor with a centrifugal impeller in one embodiment (the centrifugal impeller not being shown in section, but in side view)

The example of an airplane turbine engine 10 shown in FIG. 1 includes a compressor 16 of axial-centrifugal type comprising a plurality of axial compression stages and a single centrifugal compression stage. The compressor 16 has an embodiment of a centrifugal impeller 18 and a casing 15 surrounding the outside of the blades 24, 25 of the impeller 18. A diffuser 19 is situated downstream from the impeller 18.

The turbine engine 10 presents an air inlet 12, the air passing through the inlet 12 in order to reach the compressor 16. Rotation of the impeller 18 about its axis of rotation X sucks air in from the front of the impeller and the axial speed of the fluid passing through the impeller 18 is transformed progressively into radial speed, the fluid leaving via the outer periphery of the impeller 18. The air penetrates into the impeller 18 in a direction that is more or less parallel with the axis of rotation X of the impeller, represented in the section of FIG. 1 by arrow F1, and it leaves the impeller 18 in a direction that is more or less perpendicular to the axis X, represented by arrow F2.

The air leaving the impeller 18 passes through the diffuser 19 prior to reaching the combustion chamber 21. The combustion gas leaving the combustion chamber 21 drives one or more turbines (not shown).

The impeller 18 may be mounted on a shaft 14 that is driven in rotation by the turbine.

Figure 2:
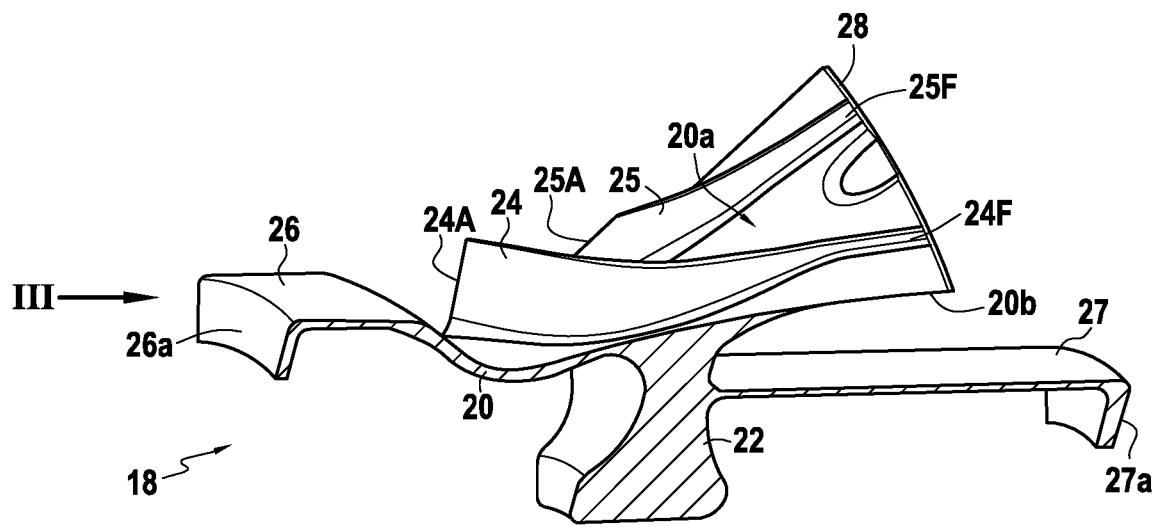
FIG. 2 is a side view in perspective of a sector of a centrifugal impeller in an embodiment of the invention.

With reference to FIG. 2, the impeller 18 comprises a body extending around the axis of rotation X, a hub 22, a front cylinder 26, and a rear cylinder 27, the front and rear cylinders 26 and 27 extending axially from the body 20 and/or the hub 22, respectively towards the front and towards the rear of the impeller 18. The front and rear cylinders 26 and 27 have respective flanges 26a and 27a. The sector shown in FIG. 2 corresponds in this embodiment to one-thirteenth of the complete impeller 18.

The body 20 has a front portion, beside the front cylinder 26, and a rear portion beside the rear cylinder 27. As can be seen from the longitudinal section of FIG. 2, the cross-section of the front portion is smaller than the cross-section of the rear portion. Furthermore, as mentioned above, the impeller 18 has a plurality of main blades 24 extending axially, substantially from the front cylinder 26 to the rear cylinder 27, and radially from the hub 22 of the impeller to the outer periphery 28 of the body. Each of the main blades 24 presents a leading edge 24A situated at the front end of the body 20 and a trailing edge 24F situated at the outer periphery of the body 20.

The impeller 18 may also have intermediate blades 25 interposed between the main blades 24 and differing therefrom in that they are axially shorter: the leading edges 25A of these blades 25 are set back (i.e. rearwards) relative to the leading edges 24A of the main blades 24. In contrast, the trailing edges 25F of the intermediate blades 25 are situated at a radial distance from the axis X that is substantially equal to the radial distance of the trailing edges 24F of the blades 24.

The main blades 24, and the intermediate blades 25, if any, project from the front face 20a of the body.

Figure 3:
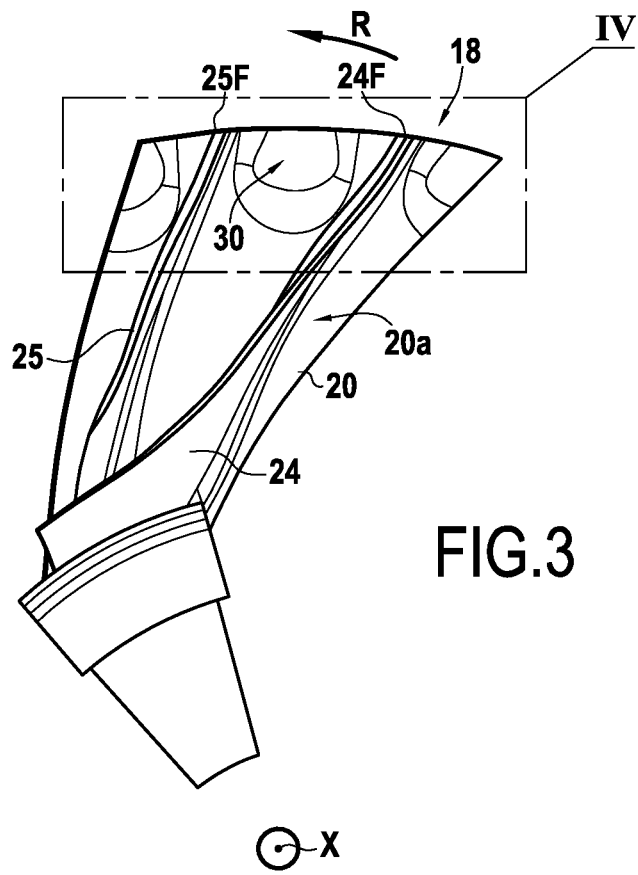
FIG. 3 is an axial view seen from the front looking along direction III of FIG. 2, and showing the FIG. 2 centrifugal impeller sector.
Figure 4:
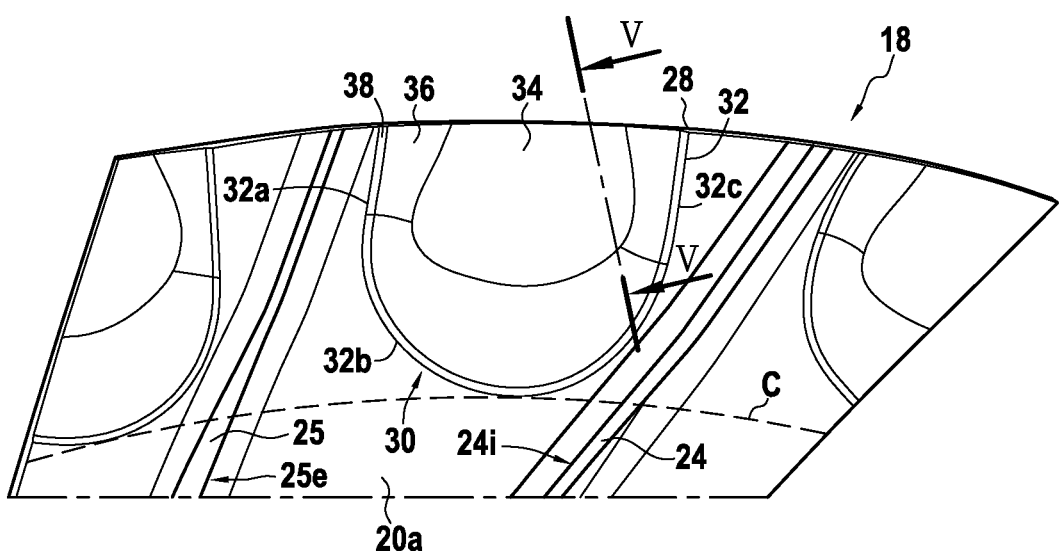
FIG. 4 is an enlarged view of a zone IV of FIG. 3.
Figure 5:
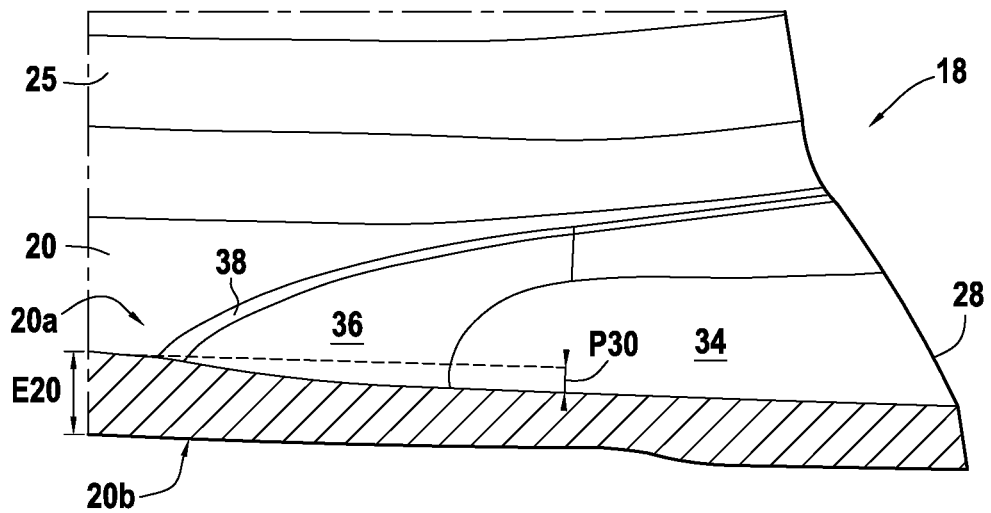
FIG. 5 is a section view of the FIG. 4 sector on plane V-V.

As shown in detail in FIGS. 3 to 5, the body 20 presents a setback 30 in its front face 20a and between two consecutive blades 24, 25, the setback 30 being situated circumferentially at a distance from said two blades 24, 25. The setback 30 is seen by the fluid flow as an offset towards the rear of the impeller 18 in the front face 20a of the body 20. The setback 30 may be provided only between two consecutive blades, or between certain consecutive blades (typically on one side only of the main blades), or between all of the blades, as in the present embodiment.

The setback 30 is defined at least in part by an outline 32 that is situated transversely at a distance from the two consecutive blades 24 and 25. The outline 32 may have various positions on the body 20. In the example shown, the setback 30 and the outline 32 are provided on a radially outer portion of the body 20. For example, the setback may be situated radially outside a circle C centered on the axis X and passing outside the middles of the main blades 24, preferably outside two-thirds or three-fourths of these main blades 24, starting form their leading edges. In this example, the radius of the circle C lies in the range 180 millimeters (mm) to 190 mm.

In any event, the outline 32 is situated at a distance from each of the two blades 24 and 25, and from any connection zones they might have with the body 20.

The outline 32 may be a closed outline, i.e. itself defining the setback 30, or it may be an open outline opening out to one end of the body 20, such that the setback is defined between the outline 32 and said end. In the example shown in FIGS. 3 and 4, the setback 30 and the outline 32 open out to the radially outer periphery 28 of the body 20.

The outline 32 of the setback 30 may be generally U-shaped. More precisely, in this embodiment, the outline 32 has two branches 32a and 32c that are substantially parallel. The branches 32a and 32c are connected together by a rounded portion 32b that is convex in this example.

In this embodiment, the branches 32a and 32c of the outline 32 lead to the outer periphery 28 of the body 20, while the rounded portion 32b has its concave side facing towards the outer periphery 28. The rounded portion 32b may be tangential to the branches 32a and 32c where it joins said branches. The outline 32 thus presents a profile that is regular and favorable for the aerodynamic performance of the impeller 18.

Relative to the radial direction, the branches 32a and 32c may present an angle of less than 60°, preferably less than 30°, preferably less than 25°, preferably less than 20°, preferably less than 18°. Relative to the radial direction, the branches 32a and 32c may present an angle greater than 5°, preferably greater than 10°, preferably greater than 12°. The angle formed between the branches 32a, 32c and the radial direction may be substantially equal to 15°. Alternatively, or in addition, the branches 32a and 32c may be substantially parallel to the trailing edge portions of the blades 24 and 25.

The rounded portion 32b may be circular. The radius of curvature of the rounded portion 32b, as shown in FIG. 4, may be less than 47.5% of the distance between the blades 24 and 25, and may be about 45% of this distance. More generally, said radius of curvature may be at least 25%, or indeed at least 40% of this distance. The distance between the branches 32a and 32c may be substantially equal to twice said radius of curvature. When the outline 32 leads to the outer periphery of the body, the distance between the blades 24 and 25 may be measured between the trailing edges of said blades. In other embodiments in which the outline 32 does not lead to the outer periphery of the body, the distance between the blades 24 and 25 may be measured on the above-mentioned circle C.

More generally, the setback 30 may extend circumferentially over at least 30% of the distance between the blades 24 and 25, preferably at least 50%, more preferably at least 60%, more preferably at least 70%.

As shown in FIG. 4, the setback 30 in this example is situated between the pressure side 24i of one blade, specifically a main blade 24, and the suction side 25e of another blade, specifically the intermediate blade 25. The radially outer end of the outline 32, formed in this example by the intersections of the branches 32a and 32c with the outer periphery 28, may be closer to said suction side 25e than to said pressure side 24i.

In this embodiment, the projection of the setback 30 onto the front face 20a of the body may present an area that is at least 70% of the area that is defined circumferentially between the two consecutive blades 24 and 25 and radially between the circle C that is tangential to the inside of the outline 32 and the outer periphery 28 of the body 20. Said projection preferably presents at least 75%, or at least 80% of said area. Said projection may present at most 95% or at most 90% of said area. By way of example, the area of the projection may be about 800 square millimeters ($mm^2$).

As shown more particularly in FIG. 5, the setback 30 has a bottom portion 34. The bottom portion 34 may be substantially parallel to the front face 20a of the body 20. The bottom portion 34 may be substantially plane. The bottom portion 34 may be generally U-shaped.

The depth P30 of the setback 30 is the axial or substantially axial distance, e.g. as measured orthogonally to the bottom portion 34, between the bottom portion 34 and the front face 20a of the body. The depth of the setback may be at least 5% of the nominal thickness E20 of the body 20 (i.e. the nominal axial distance locally between the front face 20a and the rear face 20b), preferably at least 10%, preferably at least 12%. The depth P30 of the setback may be at most 30% of said thickness E20, preferably at most 25%, preferably at most 20%, preferably at most 16%.

The bottom portion 34 may be connected to the front face 20a of the body 20 via at least a first connection zone 36, specifically via a first connection zone 36 and a second connection zone 38. The first connection zone 36 may be provided around the bottom portion 34. The second connection zone 38, if any, may be provided around the first connection zone 36. Each connection zone 36, 38 is configured to form a smooth connection between the two portions it connects together, specifically the bottom wall 34 and the second connection zone 38 for the first connection zone 36, and the first connection zone 36 and the front face 20a for the second connection zone 38. In the present example, the first and second connection zones 36, 38 are of circularly arcuate cross-section (i.e. having a radius of curvature that is constant), with their radii of curvature being determined so that the first connection zone 36 is tangential to the bottom portion 34 and the second connection zone 38 is tangential to the first connection zone 36 and to the front face 20a.

Thus, the volume of material removed at the setback 30 in comparison with a prior art impeller may be of the order of 400 cubic millimeters ($mm^3$).

In the present embodiment, the impeller 18 also has a stiffener 40 configured to reinforce a portion of the body 20 that is made thinner by the setback 30. In a first variant, the stiffener 40 is shown with reference to FIGS. 5 and 6, and in a second variant it is shown with reference to FIG. 7. In these figures, elements that correspond to or are identical to elements described above are given the same reference signs and are not described again.

The stiffener 40 may comprise extra thickness provided on the rear face 20b of the body 20. The stiffener 40 may comprise a platform 42 forming said extra thickness, and defined by its radial width, its circumferential length (measured by an angle), its thickness, and its radial and circumferential positions.

The radial width LR of the stiffener 40, specifically of the platform 42, may be less or equal to the radial width of the corresponding setback 30.

Figure 6:
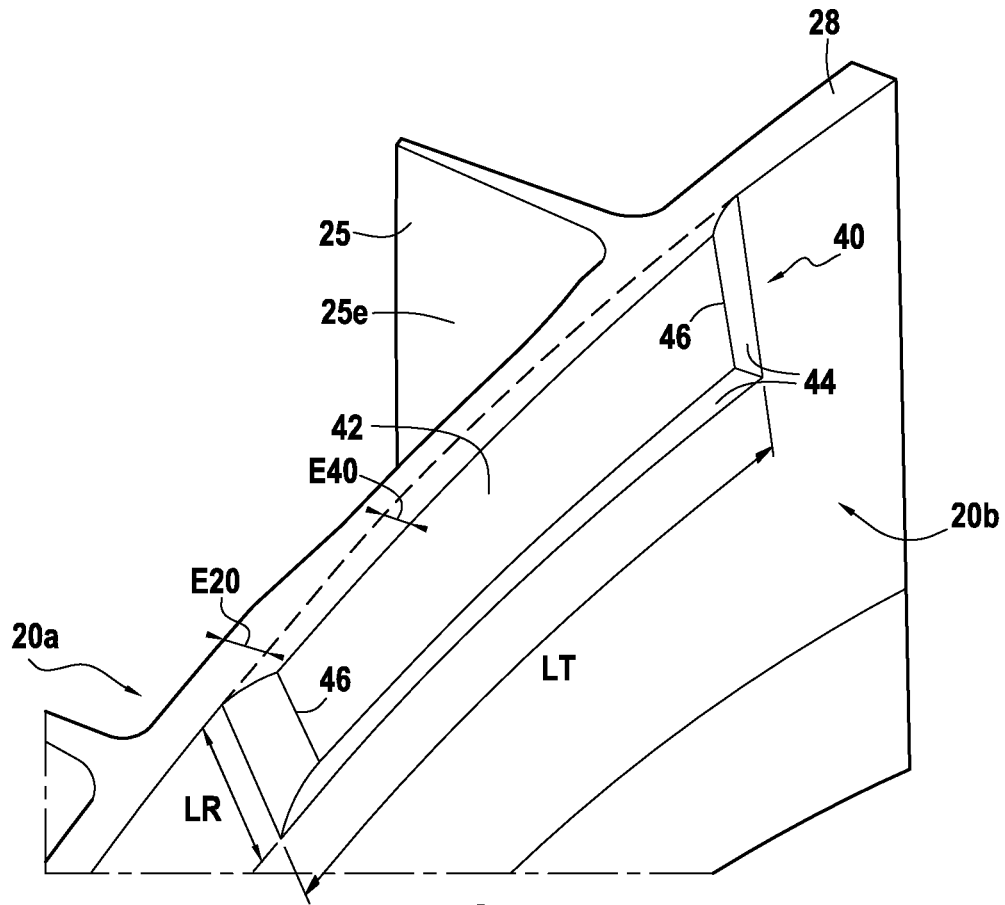
FIG. 6 is a perspective view of the rear face of the FIG. 2 impeller.
Figure 7:
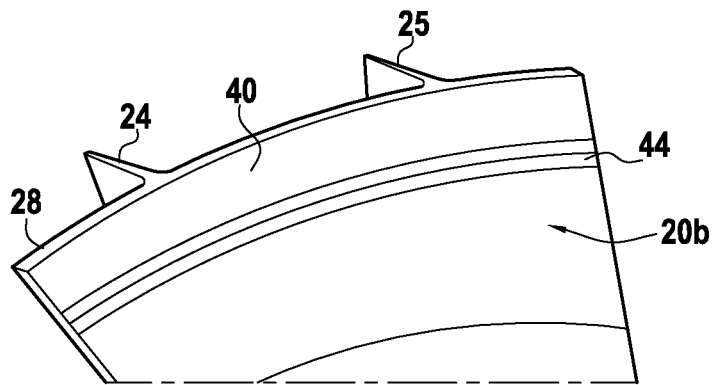
FIG. 7 is a perspective view seen from the rear of a variant of the impeller.

The circumferential length LT of the stiffener 40, specifically of the platform 42, may be angularly less than or equal to the circumferential length between two consecutive blades, and preferably greater than or equal to half the circumferential length between two consecutive blades. This corresponds to the first variant as shown in FIGS. 5 and 6. Alternatively, the circumferential length of the stiffener 40 may be equal to 360°, such that the stiffener 40, and more particularly its platform 42, forms a continuous ring around the impeller axis X. This corresponds to the second variant shown in FIG. 7.

The thickness E40 of the stiffener 40 may be measured substantially axially, or perpendicularly to the rear face of the platform 42, which in this example is substantially plane. As shown in FIG. 6, the thickness of the stiffener may be measured as the distance between the rear face of the platform 42 and the rear face 20b of the body. The thickness E40 of the stiffener 40 may be at least 10% of the nominal thickness of the body 20 (i.e. the nominal axial distance, locally, between the front face 20a and the rear face 20b), preferably at least 20%, preferably at least 25%. The thickness E40 of the stiffener 40 may be at most 40% of said nominal thickness, preferably at most 35%, preferably at most 30%. The thickness E40 of the stiffener 40 may be equal to about 28% of said nominal thickness.

The radial position of the stiffener 40 may be determined so that the stiffener 40 leads to the radially outer periphery 28 of the body 20. This gives rise to the same advantages as for the setback 30.

The tangential position of the stiffener 40 may be determined so as to overlap the tangential position of the setback 30, at least in part, as shown in FIG. 5. In addition, as shown in FIG. 6, the stiffener 40 may overlap at least a portion of a blade, in particular the blade 25, so that the stiffener 40 is situated for the most part beside its suction side 25e.

A third connection zone 44 may be provided around the stiffener 40, specifically between the platform 42 and the rear face 20b. In this embodiment, the third connection zone 44 is of circular section, sometimes said to have a "fillet", and tangential to the rear face 20b. Depending on whether the stiffener does or does not form a ring, the third connection zone 44 may be provided or not provided at the edges 46 of the stiffener 40 in the circumferential direction. The edges 46 of the stiffener 40 in the circumferential direction may optionally be mutually parallel, and they may optionally follow a radial direction.

As mentioned above, at the outlet from the impeller 18, the fluid is sent towards the diffuser 19. As shown diagrammatically in FIG. 8, the diffuser 19 has stationary vanes 50 mounted between a front casing 52 and a rear casing 54. The space between the front and rear casings 52 and 54 defines a flow passage in which the flow of the fluid is guided by the vanes 50.

Figure 8:
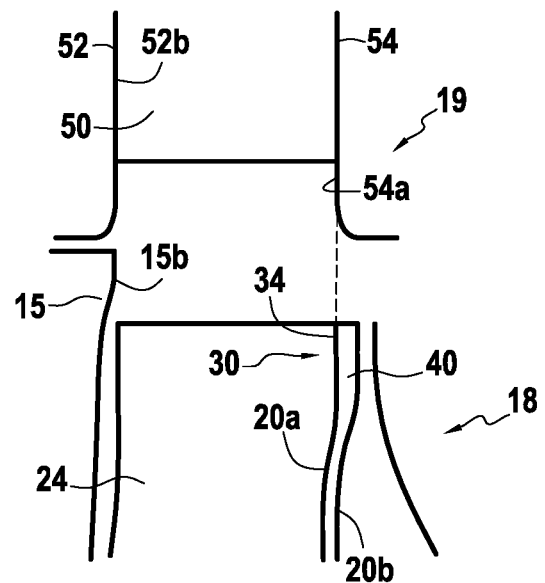
FIG. 8 is a diagrammatic and fragmentary axial section view of an embodiment of the turbine engine.

Specifically when the setback 30 opens out to the outer periphery 28 of the body, it is important to modify the diffuser 19 and/or the impeller 18, e.g. by modifying their axial positioning, so that in operation the front face 54a of the rear casing 54 runs on from the setback 30, and more precisely from the bottom portion 34. This configuration is shown in FIG. 8. In the impeller, the fluid passes between the casing 15 and the front face 20a, this space being enlarged as a result of the presence of the setback 30. In order to optimize the regularity of the flow, the fluid must not encounter an upward step as it passes into the diffuser 19, which means that, while the impeller is in operation, the front face 54a of the casing 54 must run on from or even be situated behind the setback 30, i.e. while it is hot and taking account of thermal expansions.

Ideally, the rear face 52b of the front casing 52 should also run on from or else be in front of the rear face 15b of the casing 15 of the impeller, while in operation.

The residual downward step, or enlargement of the flow section, between the front face 20a at locations that do not have a setback, and the front face 54a of the rear casing 54 of the diffuser, presents an impact that is limited or even non-existent on the aerodynamic performance of the compressor 16.

In the present embodiment, the low cycle fatigue lifetime of the impeller 30 is more than 27% greater in number of cycles than that of a prior art impeller, and the low cycle fatigue lifetime in the vicinity of the setback 30 is 41% greater.

Although the present invention is described with reference to specific embodiments, modifications may be made thereto without going beyond the general ambit of the invention as defined by the claims. In particular, individual characteristics of various embodiments shown and/or mentioned may be combined in additional embodiments. Consequently, the description and the drawings should be considered in a sense that is illustrative rather than restrictive.

The invention claimed is:

1. A centrifugal impeller having an axis of rotation extending from front to rear, and comprising:
   a body extending around the axis of rotation, the body having a front portion and a rear portion of larger section than the front portion;
   a plurality of blades projecting from a front face of the body, the body presenting a setback in the front face between two consecutive blades of the plurality of blades, which setback is situated at a circumferential distance from said two consecutive blades; and
   a stiffener configured to reinforce a portion of the body made thinner by the setback, wherein the stiffener is provided on a rear face of the body, and
   wherein a radial width of the stiffener is less or equal to a radial width of the setback and wherein the stiffener comprises a circumferential length that is angularly less than or equal to the circumferential length between the two consecutive blades.

2. The centrifugal impeller according to claim 1, wherein the setback is provided on a radially outer portion of the body.

3. The centrifugal impeller according to claim 1, wherein the setback leads to a radially outer periphery of the body.

4. The centrifugal impeller according to claim 1, wherein the setback has an outline that is U-shaped, wherein the branches of the U-shape lead to the radially outer periphery of the body.

5. The centrifugal impeller according to claim 1, wherein the setback is situated between a pressure side of a first blade of the two blades and a suction side of a second blade of the two blades, and is closer to said suction side than to said pressure side.

6. The centrifugal impeller according to claim 1, wherein the stiffener comprises extra thickness provided on the rear face of the body.

7. The centrifugal impeller according to claim 1, wherein the stiffener is in the form of a continuous ring around the axis of rotation.

8. The centrifugal impeller according to claim 1, wherein the stiffener leads to the radially outer periphery of the body.

9. A turbine engine comprising a turbine and further including a compressor provided with a centrifugal impeller according to claim 1.

10. The turbine engine according to claim 9, further comprising a diffuser placed at an outlet from the impeller, the diffuser having stationary vanes mounted between a front casing and a rear casing, the diffuser being arranged so that in operation a front face of the rear casing runs on from the setback.

11. The centrifugal impeller according to claim 1, wherein the stiffener has a thickness of at least 10%, and at most 40%, of a nominal axial distance measured locally between the front face and a rear face of the body.

12. The centrifugal impeller according to claim 1, wherein the stiffener has a thickness of at least 20%, and at most 35%, of a nominal axial distance measured locally between the front face and a rear face of the body.

13. The centrifugal impeller according to claim 1, wherein the stiffener has a thickness of at least 25%, and at most 30%, of a nominal axial distance measured locally between the front face and a rear face of the body.

14. The centrifugal impeller according to claim 1, wherein the stiffener comprises a platform having a circumferential length angularly less than or equal to the circumferential length between the two consecutive blades.

15. The centrifugal impeller according to claim 14, wherein the stiffener overlaps at least a portion of one of said two consecutive blades.

16. The centrifugal impeller according to claim 15, wherein more than half of the stiffener is situated on a suction side of said one of said two consecutive blades.

17. The centrifugal impeller according to claim 14, wherein the stiffener does not overlap any portion of another one of said two consecutive blades.

18. The centrifugal impeller according to claim 1, further comprising a front cylinder extending axially from the body toward the front, a hub, and a rear cylinder extending axially from the hub toward the rear,
   wherein the front cylinder and the rear cylinder each includes a flange at a free end thereof.

19. A centrifugal impeller having an axis of rotation extending from front to rear, and comprising:
- a body extending around the axis of rotation, the body having a front portion and a rear portion of larger section than the front portion;
- a plurality of blades projecting from a front face of the body, the body presenting a setback in the front face between two consecutive blades of the plurality of blades, which setback is situated at a circumferential distance from said two consecutive blades; and
- a stiffener configured to reinforce a portion of the body made thinner by the setback,
- wherein a radial width of the stiffener is less or equal to a radial width of the setback, and
- wherein the stiffener comprises a platform having a circumferential length angularly less than or equal to the circumferential length between the two consecutive blades.

\* \* \* \* \*